E. D. GIRD.
Wagon Axles.
No. 133,433.             Patented Nov. 26, 1872.
Fig. 1.
Fig. 2.
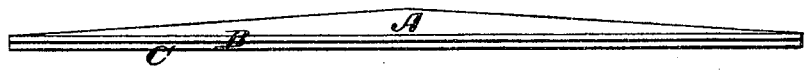
Fig. 3.
Fig. 4.      Fig. 5.
      
Fig. 6.
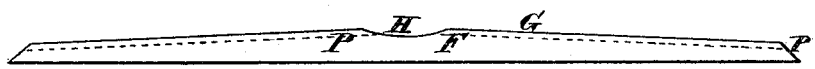
Witnesses.    Fig. 7.    Fig. 8.    Inventor.
N. D. Adams        Edwd. D. Gird
                    per C. J. Johnston,
                                        atty.

UNITED STATES PATENT OFFICE.

EDWARD D. GIRD, OF SYRACUSE, NEW YORK.

IMPROVEMENT IN WAGON-AXLES.

Specification forming part of Letters Patent No. 133,433, dated November 26, 1872.

*To all whom it may concern:*

Be it known that I, EDWARD D. GIRD, of the city of Syracuse, in the county of Onondaga and State of New York, have invented a new and Improved Axle-Tree for Wagons, Carriages, and other Vehicles, of which the following is a specification:

The nature of my invention consists in the peculiar form and mode of construction; the object being to obtain the greatest strength with the least weight of material.

By referring to the drawing making a part of this specification, it will be seen that Figure 1 is a plan or horizontal view of the axle-tree with ends attached. Fig. 2 is a view representing the main or center piece. Fig. 3 is a plan view of the end piece with groove. Fig. 4 is an end view of end piece, with both grooves formed for the reception of end of main piece. Fig. 5 is an end view of main piece or body of the axle-tree. Fig. 6 represents the wooden cap or spring-rest. Fig. 7 is a block which may be used for spring-rest in place of cap shown in Fig. 7. Fig. 8 is an end view of wooden cap.

The main or body piece A of my axle-tree is formed of iron or steel, and is shaped as shown in Fig. 2. There are four flanges. Those on the side and bottom are of equal size or depth, or nearly so. The top one, however, is made higher in the center so as to give an equal stiffness throughout. At the ends of the main piece A the flanges are as shown in Fig. 5. This main piece may be forged or rolled into the desired shape. The end pieces E E are forged or turned, and the grooves S and T are cut with a saw or tool of the proper width. The length of these grooves is shown in Fig. 3, and the end piece after their being cut is shown in Fig. 4. The end of main piece A is intended to fit into the grooves, as shown in the end views, Fig. 4. These ends are to be welded to the main piece, forming one solid axle-tree. The spring may be attached by the use of the wooden cap, Fig. 6. This cap is made with a groove, so as to fit down over the upper or top flange and rest upon the side flange B, Fig. 1. This groove is shown by the end view of the cap, Fig. 8; also a side view of same groove is shown in Figs. 6 and 7 by the line P. This cap may be of any desired length, as shown in Fig. 7, or may be in length equal to the main piece, as in Fig. 6.

Having thus described my invention, what I claim, and desire to secure by Letters Patent, is—

1. The center or main piece A, formed substantially as described, and for the purpose set forth.

2. The end pieces E E, constructed substantially as described, and for the purpose as described and shown.

3. The combination of the piece A with the ends E E, for the purpose specified.

4. The combination of the main piece A with the end pieces E E, and the cap or spring-rest H, constructed and combined as and for the purpose set forth.

EDWARD D. GIRD.

Witnesses:
SILAS J. CHESEBROUGH,
HENRY LANING.